United States Patent
Tanaka (10) Patent No.: US 8,282,879 B2
(45) Date of Patent: Oct. 9, 2012

(54) FLUID PURIFICATION DEVICE AND FLUID PURIFICATION METHOD

(75) Inventor: Toshiharu Tanaka, Nagano (JP)

(73) Assignee: Kitz Corporation, Chiba (JP)

( * ) Notice: Subject to any disclaimer, the term of this patent is extended or adjusted under 35 U.S.C. 154(b) by 782 days.

(21) Appl. No.: 12/087,110

(22) PCT Filed: Dec. 18, 2006

(86) PCT No.: PCT/JP2006/325174
§ 371 (c)(1),
(2), (4) Date: Jun. 17, 2009

(87) PCT Pub. No.: WO2007/074669
PCT Pub. Date: Jul. 5, 2007

(65) Prior Publication Data
US 2009/0269240 A1    Oct. 29, 2009

(30) Foreign Application Priority Data
Dec. 26, 2005  (JP) ................. 2005-372235

(51) Int. Cl.
*A61L 2/00* (2006.01)
*A61L 9/00* (2006.01)
*G01N 23/00* (2006.01)
*A61N 5/00* (2006.01)

(52) U.S. Cl. ............... 422/24; 422/1; 422/23; 422/28; 422/186.3; 422/305; 250/455.11; 250/492.1; 210/748.1; 210/748.03; 204/157.15

(58) Field of Classification Search .......... 422/1, 22–24, 422/28, 186.07, 186.3, 305; 250/455.11, 250/492.1; 210/748.01, 748.03, 748.1; 204/157.15
See application file for complete search history.

(56) References Cited

FOREIGN PATENT DOCUMENTS

| JP | 08-089725 | 4/1996 |
|---|---|---|
| JP | 2000-354747 | 12/2000 |
| JP | 2004-154742 | 6/2004 |
| JP | 2004-223345 | 8/2004 |
| JP | 2004-223345 | * 12/2004 |

OTHER PUBLICATIONS

Machine english translation of the "Claim + Detailed Description" section.*
International Search Report issued Jan. 16, 2007 in the International (PCT) Application of which the present application is the U.S. National Stage.

* cited by examiner

*Primary Examiner* — Jill Warden
*Assistant Examiner* — Monzer Chorbaji
(74) *Attorney, Agent, or Firm* — Wenderoth, Lind & Ponack, L.L.P.

(57) ABSTRACT

A fluid purification device includes an inner tube composed of a non-conductive material and an outer tube which is spaced apart from the inner tube by predetermined space S and composed of a non-conductive material, and the tubes are concentrically arranged. A conductive member is attached to apart or entire periphery of the inside of the outer tube to provide an electrode so as to form a device main body. When a voltage is applied to the electrode of the device main body, discharge in the space S is created by using a fluid to be treated W composed of liquid such as water which flows within the inner tube as an earth electrode.
This causes a gas such as oxygen or air flowing in the space S to be reacted to generate ozone and mixes the ozone with the fluid to be treated W so as to purify the fluid.

20 Claims, 5 Drawing Sheets

FLUID PURIFICATION DEVICE AND FLUID PURIFICATION METHOD

TECHNICAL FIELD

The present invention relates to a fluid purification device and a fluid purification method which can disinfect/purify a fluid to be treated, such as bath water, pool water, domestic wastewater, or industrial wastewater.

BACKGROUND ART

Conventionally, purification devices which disinfect/purify water such as bath water, water for a pool, or water for breeding include a water purification device which comprises a filtration means which filtrates a material to be purified and a disinfection means composed of a photocatalyst which is provided so as to be in contact with the water to be purified and a light source which irradiates the photocatalyst (for example, see Patent Document 1).

This water purification device purifies the water to be purified by the photocatalyst and the light source which comprises a fluorescent lamp or an ultraviolet lamp.

Meanwhile, there is a water treatment device in which a large-surface-area material is provided in a reaction container provided in piping through which water to be treated such as bath water flows.

An ultraviolet light source irradiates the large-surface-area material with ultraviolet rays, and an ozone injection means injects ozone to the upstream side of the reaction container (for example, see Patent Document 2).

This water treatment device injects ozone into the water to be treated by the ozone injection means, radiates ultraviolet rays from the outer surface of the reaction container which is formed to be transparent, and forms a photocatalyst on the surface of the large-surface-area material in the reaction container, thereby purifying the water to be treated by the ozone and the photocatalyst.

Moreover, there is a fluid purification device in which a reaction container comprising a double tube having an outer tube and an inner tube is provided at an intermediate position of the piping through which a fluid to be treated such as bath water flows. One electrode is positioned on the entire periphery of the outer tube of the reaction container, and another electrode which is a counterpart of the above described electrode is provided on the transparent inner tube which is spaced from the outer tube by predetermined space. Oxygen or air is supplied to the space between the outer tube and the inner tube while discharge is generated between the electrodes between the outer tube and the inner tube so as to generate ozone. The ozone is mixed with the fluid to be treated so as to purify it (for example, see Patent Document 3).

In the reaction container, the outer tube is formed of stainless steel, while the inner tube is formed of quartz glass or borosilicic acid glass, and one of the electrodes of the outer tube side serves as an earth electrode.

In the fluid purification device, a photocatalyst is installed in the inner tube, the ultraviolet rays generated by the discharge for generating ozone is utilized so as to cause the photocatalyst to be activated and functioned, and the fluid to be treated is purified by the ozone and the photocatalyst.

Patent Document 1: Japanese Patent Application Laid-Open (kokai) No. H8-89725
Patent Document 2: Japanese Patent Application Laid-Open (kokai) No. 2004-154742
Patent Document 3: Japanese Patent Application Laid-Open (kokai) No. 2004-223345

However, in the water purification device of Patent Document 1, an attempt is made to improve the disinfection performance by performing disinfection by the photocatalyst and the light source instead of disinfection which is performed merely by an ultraviolet lamp. However, this cannot be considered to have the disinfection performance capable of sufficiently disinfecting the water to be treated.

In the water treatment device of Patent Document 2, since ozone is injected into the water to be treated, the disinfection performance can be enhanced by ozone having high disinfection effects in addition to the photocatalyst. However, in this case, the water treatment device has the structure in which the ozone injection means is provided as another device in the upstream side of the reaction container, and ozone is separately generated by the outside ozone injection means. Therefore, there has been a problem that the entire device becomes complex and large.

The fluid purification device of Patent Document 3 is intended to solve the problem of Patent Document 2 by generating the ozone and the photocatalyst in the reaction container comprising the double tube and purifying the fluid to be treated by a simple structure while the strong disinfection effects of ozone are exerted. However, since this fluid purification device has the structure in which the outer tube of the reaction container is a metal composed of stainless steel, and the inner tube is a dielectric body composed of transparent glass, the following problem have been newly generated.

Specifically, in the fluid purification device, discharge is generated between the electrodes of the reaction container, and, when the electrode is provided on the outer surface side of the inner tube to generate the discharge in the case in which the electrode is provided between the inner tube and the outer tube to generate the discharge, there has been a problem that arc discharge occurs, and a large sound is generated.

On the other hand, when the electrode is caused to be in close contact with the inner surface side of the inner tube, silent discharge occurs, and the problem of generation of the sound can be solved.

However, when the electrode of the inner surface side of the inner tube is charged to be a high-voltage side in this case, and if the fluid that flows within the inner tube is liquid, the liquid is charged to have a high voltage. As a result, there has been a possibility that the pipe connected to the inner tube may be charged to a high voltage, and a dangerous state may be caused. In addition, a protection device is needed when the inner surface side is charged to a high voltage in this manner.

However, attachment of the protection device has been difficult.

Even when the outer tube is caused to be charged to be a high-voltage side, adverse effects may be exerted on the outer side of the outer tube. Therefore, a protection device of a high voltage power supply has been needed.

SUMMARY OF THE INVENTION

The present invention has been developed as a result of extensive studies in view of the foregoing facts, and it is an object thereof to provide a fluid purification device and a fluid purification method capable of exerting high disinfection/purification functions by a simple structure. It is another object to provide the fluid purification device and the fluid purification method capable of suppressing generation of noises, high-voltage charge and the like upon disinfection/purification of a fluid to be treated comprising liquid such as water and exerting the disinfection/purification functions in a stable state.

In order to achieve the above described objects, the invention is a fluid purification device, wherein an inner tube composed of a non-conductive material and an outer tube which is spaced apart from the inner tube by a predetermined space and composed of a non-conductive material are concentrically provided. A conductive member is attached to a part or entire periphery of the inside of the outer tube to provide an electrode so as to form a device main body. The fluid purification device has a liquid purification function which, when a voltage is applied to the electrode of the device main body, performs discharge in the space by using a fluid to be treated composed of liquid such as water which flows within the inner tube as an earth electrode so as to cause a gas such as oxygen or air flowing in the space to be reacted to generate ozone, and mixes the ozone with the fluid to be treated so as to purify the fluid.

The invention is also a fluid purification device, wherein an inner tube composed of a non-conductive material and an outer tube which is spaced apart from the inner tube by a predetermined space and composed of a non-conductive material are concentrically provided. A conductive member is attached to a part or entire periphery of the inside of the outer tube to provide one electrode.

A conductive member having a width equivalent or more than the width of the electrode of the outer tube is attached to the inside of the inner tube to provide another electrode so as to form a device main body. The fluid purification device has a gas purification function which, when a voltage is applied between the electrodes of the device main body, performs discharge in the space so as to cause a gas such as oxygen or air flowing in the space to be reacted to generate ozone and mixes the ozone with a fluid to be treated composed of a gas flowing within the inner tube so as to purify the fluid.

The invention is also the fluid purification device, wherein a photocatalyst is formed in the inner tube.

The invention is also the fluid purification device, wherein the outer tube and the inner tube are formed of a transparent or semi-transparent material, and an ultraviolet light source which irradiates the outer peripheral side of the outer tube with ultraviolet light is provided.

The invention is also the fluid purification device, wherein the ultraviolet light source is an electrodeless discharge tube.

The invention is also the fluid purification device, wherein the gas flowing in the space between the outer tube and the inner tube is pressurized to 0.2 to 1 MPa by a device such as a compression device and then subjected to flow control adjustment to 1 to 20 L/min by a fluid controller.

The invention is also the fluid purification device, wherein the gas flowing in the space between the outer tube and the inner tube is pressurized to 0.2 to 1 MPa by a device such as a compression device, then is caused to pass through an air dryer, and is subjected to flow control adjustment to 1 to 20 L/min by a fluid controller.

The invention is also the fluid purification device, wherein a tubular body is attached to an upstream side of the device main body, and at least a hair catcher is attachably/detachably incorporated within the tubular body.

The invention is also a fluid purification method, wherein an inner tube composed of a non-conductive material and an outer tube which is spaced apart from the inner tube by predetermined space and composed of a non-conductive material are concentrically provided. A conductive member is attached to a part or entire periphery of the inside of the outer tube to provide an electrode.

When a voltage is applied to the electrode, discharge is performed in the space by using a fluid to be treated composed of liquid such as water which flows within the inner tube as an earth electrode so as to cause a gas such as oxygen or air flowing in the space to be reacted to generate ozone. The ozone is mixed with the fluid to be treated so as to purify the fluid.

The invention is also a fluid purification method, wherein an inner tube composed of a non-conductive material and an outer tube which is spaced apart from the inner tube by a predetermined space and composed of a non-conductive material are concentrically provided. A conductive member is attached to a part or entire periphery of the inside of the outer tube to provide one electrode.

A conductive member having a width equivalent or more than the width of the electrode of the outer tube is attached to the inside of the inner tube to provide another electrode. When a voltage is applied between the electrodes of the device main body, discharge is performed in the space so as to cause a gas such as oxygen or air flowing in the space to be reacted to generate ozone. The ozone is mixed with a fluid to be treated composed of a gas flowing within the inner tube so as to purify the fluid.

The invention is also the fluid purification method, wherein a photocatalyst is formed in the inner tube, and the photocatalyst is caused to function by ultraviolet light generated when the discharge is performed in the space.

In the fluid purification method an ultraviolet light source can be provided in the outer peripheral side of the outer tube, and the photocatalyst is caused to function by the ultraviolet light of the ultraviolet light source.

According to the invention, the fluid purification device can be capable of exerting high disinfection/purification functions by generating a large amount of ozone and effectively mixing it with the fluid to be treated by a simple structure and the fluid purification device capable of, when the fluid to be treated is liquid, exerting the disinfection/purification functions while suppressing generation of large sounds and charging of piping to a high voltage by performing discharge by silent discharge. In addition, since a protection device is not required, ozone can be generated in a stable state.

According to the invention, the fluid purification device capable of safely generating a large amount of ozone even when the fluid to be treated is a gas and the fluid purification device having high disinfection/purification effects by efficiently mixing the ozone with the fluid to be treated can be provided.

According to the invention, the fluid purification device capable of effectively disinfecting/purifying the fluid to be treated by the photocatalyst by causing ultraviolet rays generated by discharge from the electrode to act on the photocatalyst can be provided.

According to the invention with transparent tubes, the fluid purification device capable of effectively irradiating the photocatalyst with the ultraviolet light from the ultraviolet light source and significantly improving the disinfection/purification functions by the photocatalyst by the ultraviolet light can be provided.

According to the invention, the fluid purification device capable of causing the ultraviolet light source to emit light without providing electrodes, simplifying the structure, and reducing cost by omitting accessories or the like for causing the ultraviolet light source to emit light can be provided.

According to the invention, the fluid purification device capable of effectively generating ozone from the oxygen or air flowing between the outer tube and the inner tube can be provided. Furthermore, according to the invention, the fluid purification device capable of more effectively generating ozone by preventing dew condensation of the oxygen or air and utilizing the fed oxygen or air without waste can be provided.

According to the invention, mixed matters such as hair or garbage mixed in the fluid to be treated can be removed, and the entirety can be made compact. When the fluid purification device is to be replaced, it can be performed merely by detaching the device main body from the tubular body, and the working space required for replacement can be reduced.

According to the invention, the fluid purification method is capable of exerting high disinfection/purification functions by generating a large amount of ozone and effectively mixing it with the fluid to be treated by a simple structure.

When the fluid to be treated is liquid, the fluid purification method is capable of exerting the disinfection/purification functions by performing discharge by silent discharge so as to suppress generation of large sounds and charging of the piping to a high voltage. In addition, since the protection device is not required, ozone can be generated in a stable state.

According to the invention, the fluid purification method is capable of generating a large amount of ozone safely even when the fluid to be treated is a gas, and the fluid purification method is capable of enhancing the disinfection/purification effects by efficiently mixing the ozone with the fluid to be treated.

According to the invention, the fluid purification method is capable of effectively disinfecting/purifying the fluid to be treated by the photocatalyst by causing the ultraviolet rays generated by the discharge from the electrode to act on the photocatalyst.

According to the invention, the fluid purification method is capable of effectively irradiating the photocatalyst with the ultraviolet light from the ultraviolet light source and significantly improving the disinfection/purification functions, which are implemented by the photocatalyst, by the ultraviolet light.

10 DEVICE MAIN BODY
15 COMPRESSOR (DEVICE)
16 FLUID CONTROLLING DEVICE
17 AIR DRYER
27 INNER TUBE
28 OUTER TUBE
30 ELECTRODE
32 PHOTOCATALYST
34 ULTRAVIOLET LIGHT SOURCE
S SPACE
W FLUID TO BE TREATED

DETAILED DESCRIPTION OF THE INVENTION

An example of a fluid purification device and a fluid purification method in the present invention will be described in detail based on an embodiment.

Figure 1:
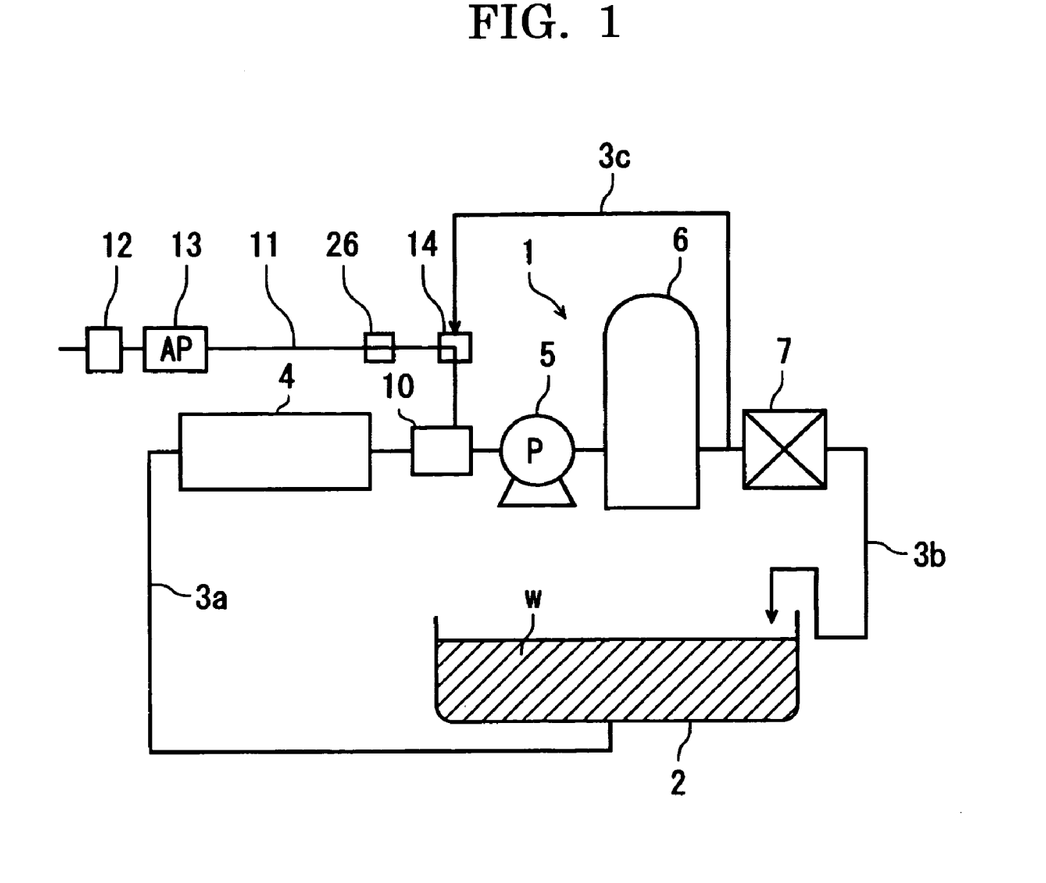
FIG. 1 is a schematic diagram showing a fluid purification system.

In FIG. 1, a schematic diagram of a fluid purification system utilizing a fluid purification device of the present invention is shown. The fluid purification system 1 treats liquid such as water as a fluid to be treated, and is to be utilized in a hot spring, health facility and the like in the present embodiment. The system treats circulating hot water of a bath as a fluid to be treated (water to be treated) W.

In the fluid purification system 1, the water to be treated W is retained in a bath 2, and the water W to be treated is arranged to be circulated by connecting a hair catcher 4, a device main body 10 of the fluid purification device, a circulation pump 5, a filtration tank 6, and a heat exchanger 7 by circulation piping 3.

The hair catcher 4 is provided in front of the device main body 10 so as to collect comparatively large contaminants such as hair, garbage and the like mixed in the water to be treated W of the bath 2. Tubular bodies 21 and 22, which will be described later, are attached to the device main body 10, and, among these, at least in the tubular body 21 of the upstream side, at least the hair catcher 4 is attachably/detachably incorporated.

The circulation pump 5 is arranged to pump up the water to be treated W of the bath 2 and circulate the water in the circulation piping 3. The filtration tank 6 is provided in the downstream side of the circulation pump 5 and is provided so as to be able to filtrate and remove fine foreign substances and the like which cannot be collected by the hair catcher 4. The heat exchanger 7 is provided in the downstream side of the filtration tank 6 so as to increase the temperature of the water to be treated W to a predetermined temperature.

Piping 3a generally has a negative pressure since it is a primary side of the pump, and piping 3b of the pump secondary side has a positive pressure.

A branched pipe 3c which is branched from the part in front of the heat exchanger 7 at which the positive pressure is highest is connected to a mixing device (ejector) 14 and facilitates mixture of ozone and the fluid to be treated W.

Separately from the circulation piping 3, air piping 11 is connected to the device main body 10; and a filter 12, an air pump 13, and an ejector 14 are provided on the air piping 11. The filter 12 removes foreign substances such as dust mixed in a gas such as oxygen or air sucked by the air pump 13, and they are provided so that the gas can be supplied to the device main body 10 by the air pump 13 via the air piping 11 and the ejector 14.

The ejector 14 is attached at a part in front of the device main body 10 and is formed to have a ring-like shape, which is not shown, by using a ceramic or a metal as the material. By virtue of this, the gas from the air pump 13 is mixed with the fluid from the branched pipe 3c, thereby causing it to be like fine bubbles and discharging them to the device main body 10 side.

Figure 2:
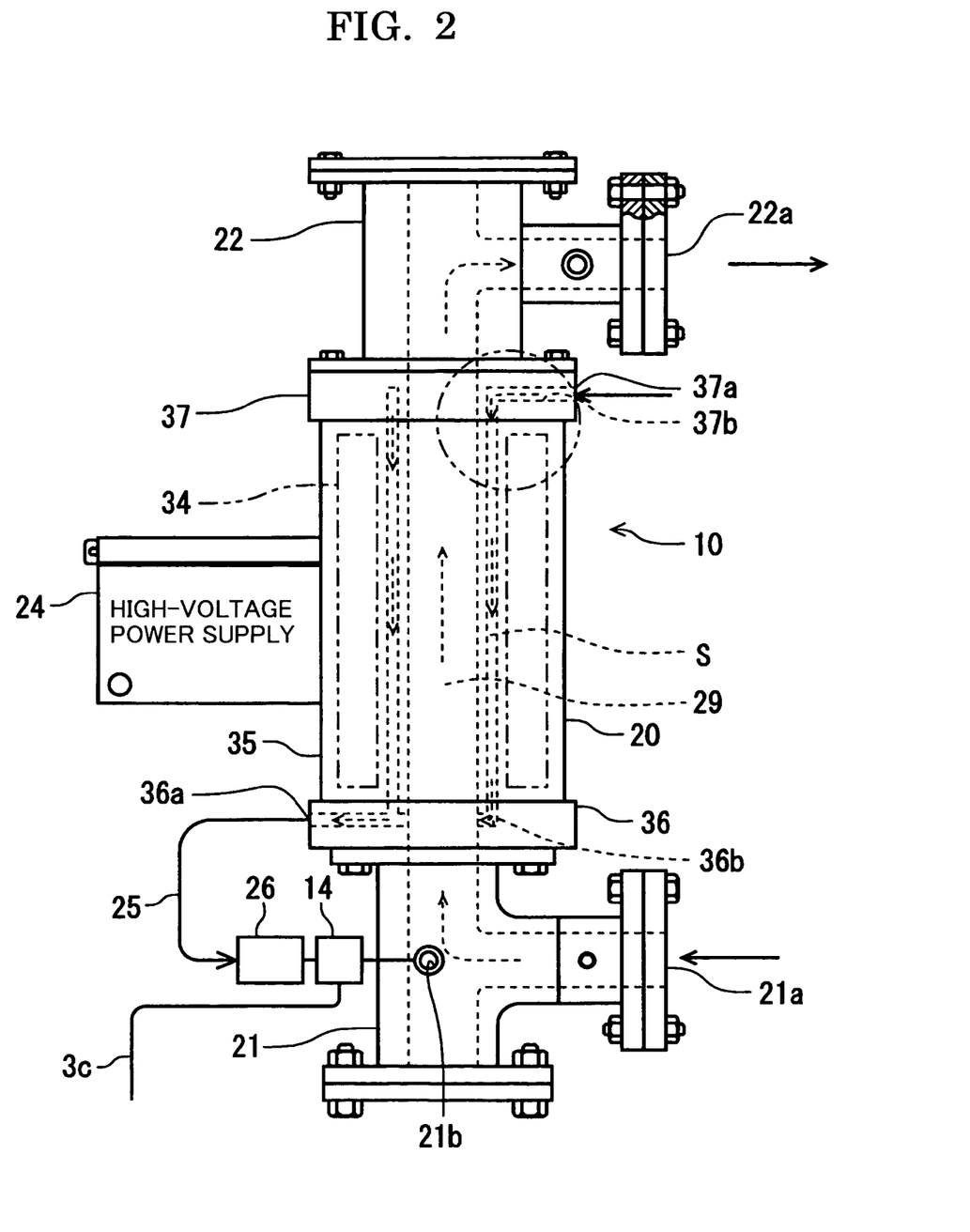
FIG. 2 is a front view showing an example of a fluid purification device of the present invention.
Figure 3:
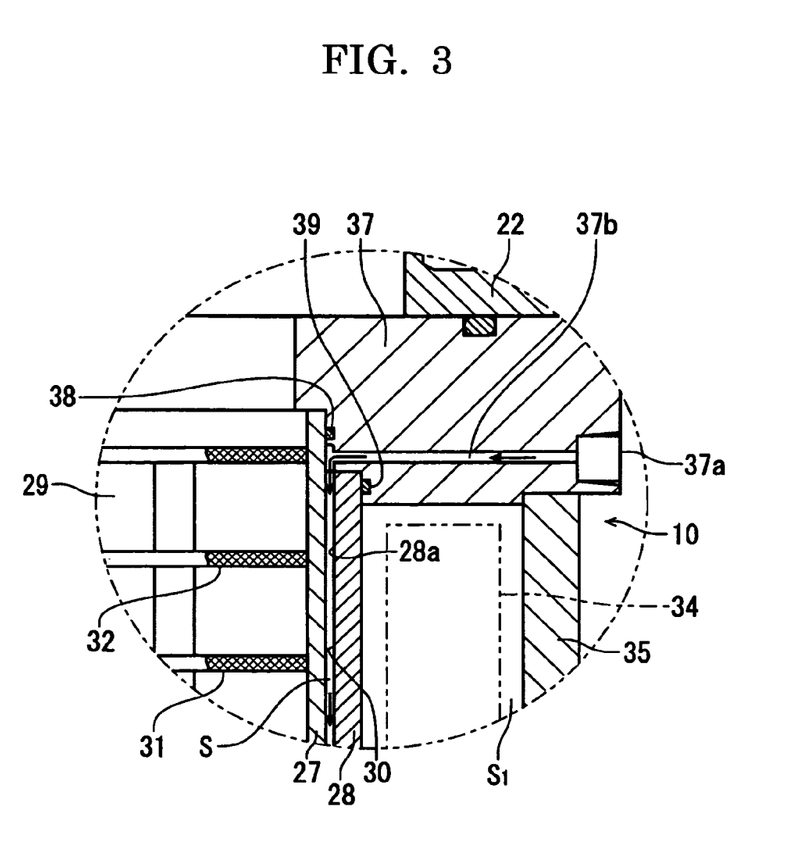
FIG. 3 is an enlarged cross sectional view of a main part of FIG. 2.

In FIGS. 2 and 3, the device main body 10 is formed by combining a case main body 20, tubular bodies 21 and 22 which serve as a channel of the fluid to be treated W and have upstream/downstream sides, a high-voltage power supply 24, and an ozone supply channel 25. These are combined with a check valve 26 and the above described ejector 14.

Within the case main body 20, as shown in FIG. 3, an inner tube 27 having, in the inner side thereof, a fluid channel 29 through which the water to be treated W flows and an outer tube 28 spaced apart from the inner tube 27 by predetermined space S are provided. The gap of the space S of the inner tube 27 and the outer tube 28 is, for example, a gap of about 0.5 to 2 mm, and, since the inner tube 27 and the outer tube 28 are concentrically provided, the gap becomes uniform in the circumferential direction.

Figure 5:
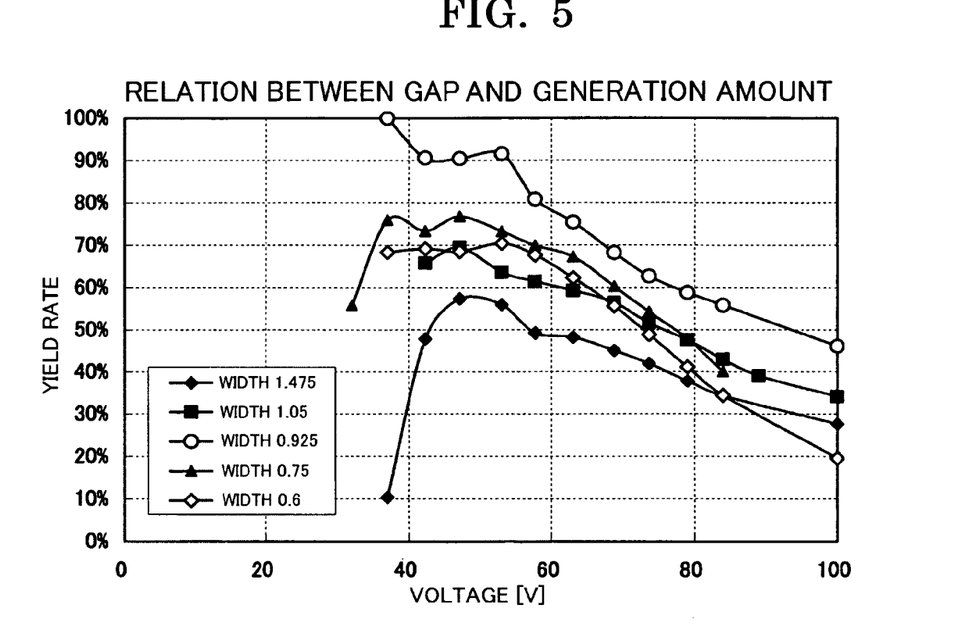
FIG. 5 is a graph showing the generation efficiency of ozone depending on the difference in the gap width between an outer tube and an inner tube.

In this case, as shown in FIG. 5, the gap of the space is most desirably within the range of about 0.6 to 1.5 mm, wherein the yield rate is increased even with respect to different voltages, and the generation amount of ozone, which will be described later, can be increased.

The inner tube 27 and the outer tube 28 are formed of a non-conductive material and, for example, are formed of a transparent or semi-transparent glass material which allows transmission of ultraviolet rays. The glass material is desired to be a material which readily allows transmission of ultraviolet rays such as quartz glass, borosilicic acid glass and the like. Borosilicic acid glass and high silicic acid glass are comparatively inexpensive, and normal materials thereof can be used without modification. However, when the points of ultraviolet-ray transmittance, thermal resistance, strength and the like are taken into consideration, quartz glass is most preferable.

A conductive material is provided on the inside of the outer tube 28 so as to be an electrode 30 which is for high-voltage charging, and the electrode 30 is connected to the unshown positive side of the high-voltage power supply 24 which is provided outside of the outer tube 28. When a voltage is applied to the electrode 30 by the high-voltage power supply 24, the outer tube 28 is charged so as to be able to perform discharge to the inner tube 27 side. The electrode 30 is merely required to have a simple belt-like shape. In the present embodiment, the electrode is formed to have an approximately C-shape in a cross section and is provided to have a width of about 10 to 50 mm along an inner peripheral surface 28a of the outer tube 28 at a part of the inner peripheral surface 28a in the circumferential direction. However, the electrode 30 may be provided over approximately circularly (entire circumference) along the inner peripheral surface 28a.

The material of the electrode 30 is, for example, stainless steel, and the material formed like a thin film is used. However, other than this, a thin film strong against both discharge and ozone can be formed by attaching nickel chrome by vacuum vapor deposition. As other materials, for example, aluminum, copper, or titanium can be used. However, when aluminum or copper is used, surface treatment such as coating has to be performed for resistance against ozone. However, when the moisture content rate of air or oxygen is low, it can be used without a problem.

Within the inner tube 27, a large-surface-area material 31 made of titanium or a titanium alloy which comprises, for example, nets or titanium wires, an aggregate of fibrous titanium materials, or another porous titanium material is housed. On the large-surface-area material 31, a photocatalyst 32 of titanium dioxide may be formed on a first surface thereof in advance. Alternatively, as is described later, the photocatalyst 32 of titanium dioxide may be formed during usage by generated ozone.

When the large-surface-area material 31 is finely formed, the reactivity with ozone is increased, and the photocatalyst 32 can be reliably formed. The large-surface-area material 31 may be formed by a material other than titanium and the titanium alloy, and, for example, a material such as glass, stainless steel, silica gel and the like can be used as the large-surface-area material 31.

In the outer peripheral side of the outer tube 28, an ultraviolet light source 34 such as a fluorescent lamp which radiates ultraviolet light is disposed. The ultraviolet light source 34 is desired to contain a large amount of ultraviolet light (for example, having a wavelength of 410 nm or less) which causes the photocatalyst 32 of the titanium dioxide to efficiently generate positive holes and electrons, and the light source may be, for example, an ultraviolet lamp, a low-pressure/high-pressure mercury lamp, or a fluorescent lamp having a wavelength of 300 to 400 nm. Furthermore, the light source may be an array of a plurality of LEDs which radiate ultraviolet light. When LED lamps are used, the life can be extended, and miniaturization can be also enabled.

Furthermore, since the calorific value can be also suppressed, more efficient purification of a fluid can be performed.

When the ultraviolet light source 34 is formed to have any of various shapes such as a linear (straight) shape, a cylindrical (circular) shape, a spiral shape, and a wave shape, the photocatalyst 32 can be caused to function more effectively. Furthermore, the ultraviolet light source 34 of the present embodiment is an electrodeless discharge tube which can perform discharge without electrodes.

Therefore, the electrodeless discharge tube 34 is caused to be adjacent to the electrode 30 upon discharge in ozone generation so that it is provided to be able to emit light without electrodes. In order to light the electrodeless discharge tube 34 brightly, the electrode 30 of a high frequency is preferred to be used at a high voltage. Furthermore, other than the electrodeless discharge tube, the ultraviolet light source 34 may use that of a type in which normal electrodes are provided to emit light.

In the further outer peripheral side of the outer tube 28, a protection tube 35 having an insulation property is provided, thereby forming heat insulation space $S_1$ between the outer tube 28 and the protection tube 35, and the ultraviolet light source 34 is housed in the heat insulation space $S_1$. In order to effectively radiate the discharge light by the ultraviolet light source 34 and the electrode 30, unshown aluminum or the like may be pasted on the inner surface side of the protection tube 35 by a means such as vapor deposition. In this case, since ultraviolet light and the like can be reflected, radiation can be performed at high efficiency.

The inner tube 27, the outer tube 28, and the protection tube 35 are integrated by attachment tubes 36 and 37, and O-rings 38 and 39 made of, for example, EPDM (ternary copolymer of ethylene, propylene, and diene monomer for cross linking) are attached between the inner tube 27 and the outer tube 28 and the attachment tubes 36 and 37. Thus, leakage of ozone and the water to be treated W to outside is eliminated, and the attachment tubes 36 and 37 can be readily detached upon disassembly in maintenance or the like.

After the attachment tubes 36 and 37 are combined, air channel 36b and 37b formed in the attachment tubes 36 and 37 are communicated with the space S. When a gas such as air or oxygen is introduced from an inlet 37a provided in the attachment tube 37, the gas passes through the space S through the air channel 36b and then can be discharged from an outlet 36a through an air channel 36b in the attachment tube 36. The check valve 26 is provided at an intermediate position of the ozone supply channel 25 connected to the outlet 36a. Therefore, the ozone discharged from the outlet 36a goes through the check valve 26, the flow rate of the fluid from the branched pipe 3c is increased by an unshown narrow path within the ejector 14, and it is supplied in a mixed state from the tubular body 21.

An ozone supply opening 21b is communicated with a fluid channel 29 and is provided so that ozone can be mixed with the water to be treated W flowing through the fluid channel 29.

The tubular bodies 21 and 22 having an inflow opening 21a and an outflow opening 22a are connected to the attachment tubes 36 and 37. Thus, the water to be treated W that flows in from the inflow opening 21a passes through the fluid channel 29, mixed with ozone, and then flows out from the outflow opening 22a.

Operation of the above described embodiment of the fluid purification device in the present invention will be described below. The water to be treated W is pressurized by the circulation pump 5, fed into the filtration tank 6 with a pressure, wherein foreign substances and the like are removed, then heated to a certain temperature via the heat exchanger 7, and returned into the bath 2. In the upstream side of the circulation pump 5, the water to be treated W from the bath 2 sucked by the circulation pump 5 flows into the device main body 10 after hair and the like is removed by the hair catcher 4.

Meanwhile, when a gas is introduced from the inlet 37a of the device main body 10 by the air piping 11, the gas is introduced into the space S through the air channel 37b.

At this point, when the electrode 30 provided on the outer tube 28 is positively charged by the high-voltage power supply 24, the water to be treated W flowing through the fluid channel 29 of the inner tube 27 serves as an earth electrode and is negatively charged, and discharge is performed from the electrode 30 toward the earth electrode (water to be treated W). The electrode 30 has a belt-like shape, and the water to be treated W is liquid. Therefore, this discharge becomes silent discharge, and ozone is generated when the gas passes through this discharge section.

The generated ozone passes through the air channel 36b, is discharged from the outlet 36a, supplied in the state of fine bubbles from the ozone supply opening 21b via the check valve 26 and the ejector 14 in the upstream side of the water to be treated W, and is mixed with the water to be treated W from the upstream side of the fluid channel 29. As a result, a purification treatment of the water to be treated W by the ozone can be performed.

The water to be treated W mixed with the ozone passes through the gaps of the large-surface-area material 31, and ultraviolet light is generated upon discharge of the electrode 30. When this ultraviolet light irradiates the photocatalyst 32 of the large-surface-area material 31, the disinfection/purification function by the photocatalyst 32 works in the manner described below, thereby simultaneously performing treatment of the water to be treated W.

Since the inner tube 27 and the outer tube 28 are formed of a transparent or semi-transparent glass material, the ultraviolet light from the ultraviolet light source 34 can irradiate (and activate) the photocatalyst 32 at high efficiency, and the function of the photocatalyst 32 is improved.

Even when the photocatalyst 32 on the surface of the large-surface-area material 31 is exfoliated, the ozone in the water to be treated W undergoes oxidation reaction with the exposed titanium atoms, so that the photocatalyst 32 comprising titanium dioxide can be always generated on the surface of the large-surface-area material 31.

The principles of the disinfection/purification action using the photocatalyst 32 will be described. When the photocatalyst 32 such as titanium dioxide which is a semiconductor substance is irradiated with ultraviolet light having a wavelength of 400 nm or less, positive holes are generated in the valence band, and electrons are generated in the conductive band. The oxidation potential of the positive holes are lower than the oxidation potentials of fluorine, ozone, hydrogen peroxide and the like, organic matters are completely oxidized and decomposed by the photocatalyst 32 and finally completely oxidized into a carbon dioxide gas and water, a sulfuric acid, a nitric acid and the like. In the mechanism of the oxidation reaction by the photocatalyst 32, oxidation reactions are considered to be caused by the positive holes, which are generated when the photocatalyst 32 is irradiated with ultraviolet light, or hydrooxyl radicals (OH radicals), which are generated by the reaction between the positive holes and water and have extremely excellent reaction activity. At this point, the reduction reaction between the electrons, which are generated at the same time as the positive holes generated when the ultraviolet light is irradiated, and an oxide gas and the like progresses in parallel. The action of the photocatalyst 32 has the disinfection performance that is stronger than conventional disinfection agents such as ozone, hydrogen peroxide, chlorine and the like, and also has decomposition performance of the organic matters. Moreover, since the life of the positive holes or OH radicals generated by the light irradiation is a millisecond or less, which is short, there is no remainder after treatment like the oxidizing agents such as ozone and hydrogen peroxide, and there is an advantage that the device that treats the remaining oxidizing agent is not required. Therefore, the water to be treated W can be effectively purified by using the photocatalyst 32.

Ozone has strong disinfection power and has extremely high purifying power. In addition, since it can decompose organic matters, it has large effects on purification of circulating water, purification of water supply and sewerage, disinfection and the like. However, a certain type of oxides and organic matters include the substances which are not reacted with ozone, and some of the circulating water of hot springs and the like cannot be treated depending on the spring quality. In this case, almost all the spring quality can be treated by combining ozone with the photocatalyst 32.

Figure 6:
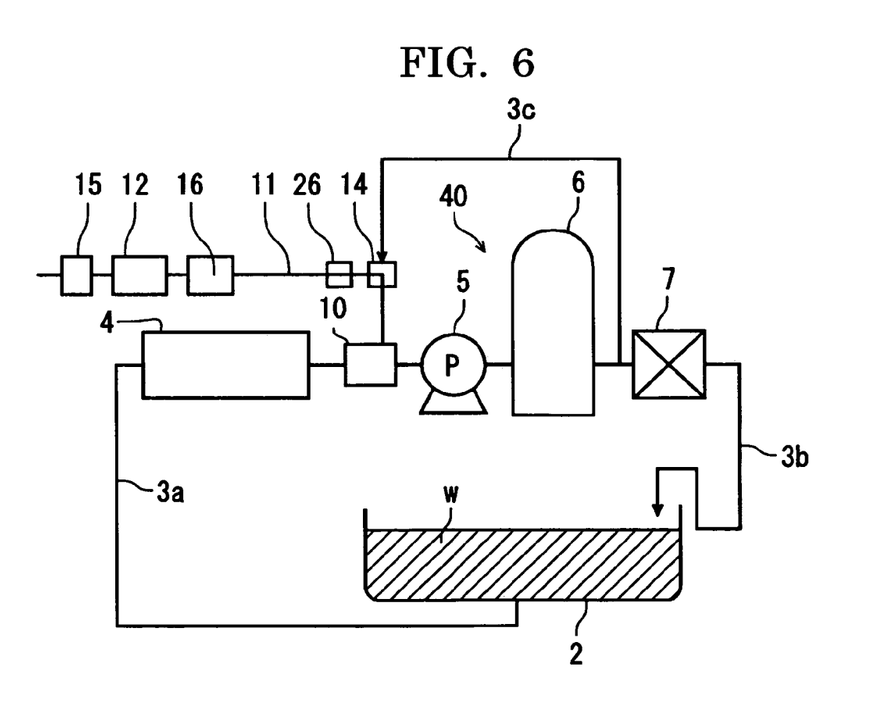
FIG. 6 is a schematic diagram showing another example of the fluid purification system.

As shown in FIG. 6, a device 15 such as a compressor (compression device) may be provided in the upstream side of the device main body 10.

Specifically, a fluid purification system 40 may be configured so that, subsequent to the compressor 15, the filter 12 and, in addition to that, a fluid controller 16 are provided in the air piping 11.

In the fluid purification system 40, air is pressurized by the compressor 15 to about 0.2 to 1 MPa and then fed to the fluid controller 16, flow control adjustment to 1 to 20 L/min is performed by the fluid controller 16, and the air is caused to flow through the space S between the inner tube 27 and the outer tube 28. Thus, compared with the case in which merely suction by a normal air pump and ejector is performed, the generation amount of ozone that is about 1.3 to 1.5 times larger can be obtained.

Figure 7:
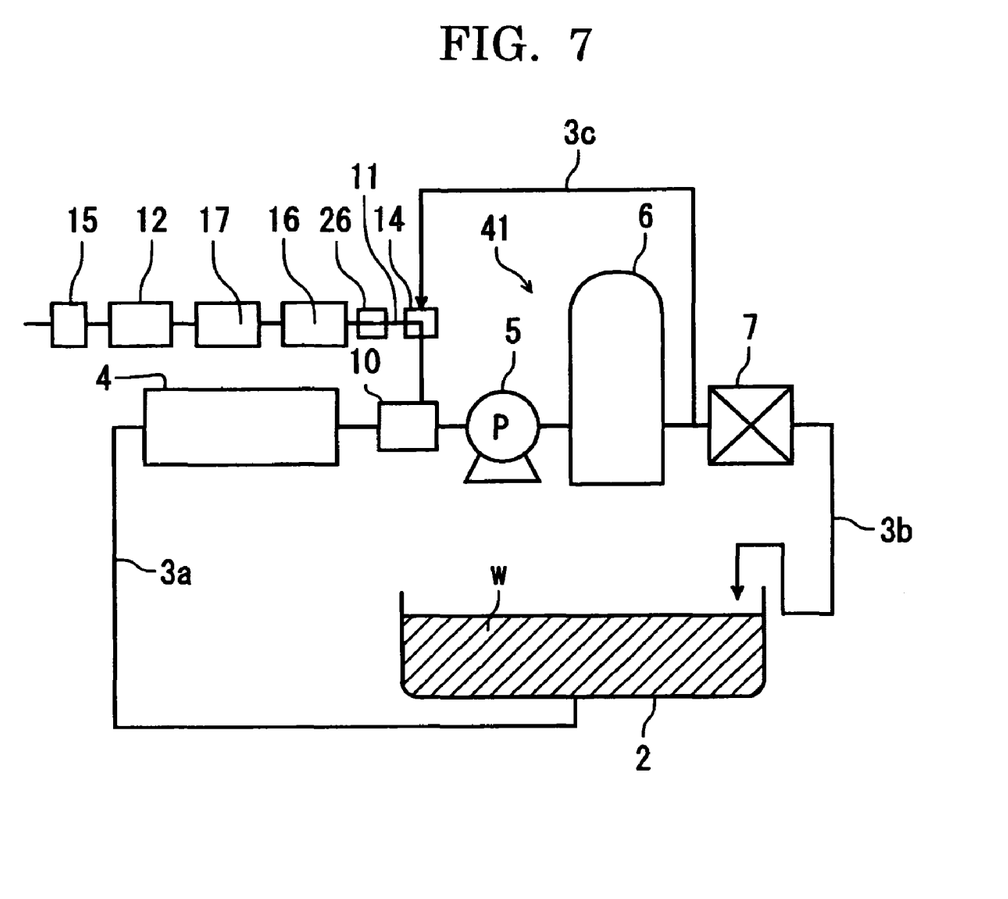
FIG. 7 is a schematic diagram showing further another example of the fluid purification system.

As shown in FIG. 7, a fluid purification system 41 may be configured so that, subsequent to the device 15 such as a compressor, the filter 12, an air dryer 17, and the fluid controller 16 are provided in the air piping 11. In the fluid purification system 41, air is pressurized by the compressor 15 to about 0.2 to 1 MPa, then goes through the air dryer 17, then is fed to the fluid controller 16, and is subjected to flow control adjustment by the fluid controller 16 to 1 to 20 L/min. The air is caused to flow through the space S. In this manner, the air for generating ozone is desired to be dry air, and the generation amount of ozone is significantly increased when the air compressed by the compressor is used in generation of ozone, and, furthermore, when dry air is used.

Figure 4:
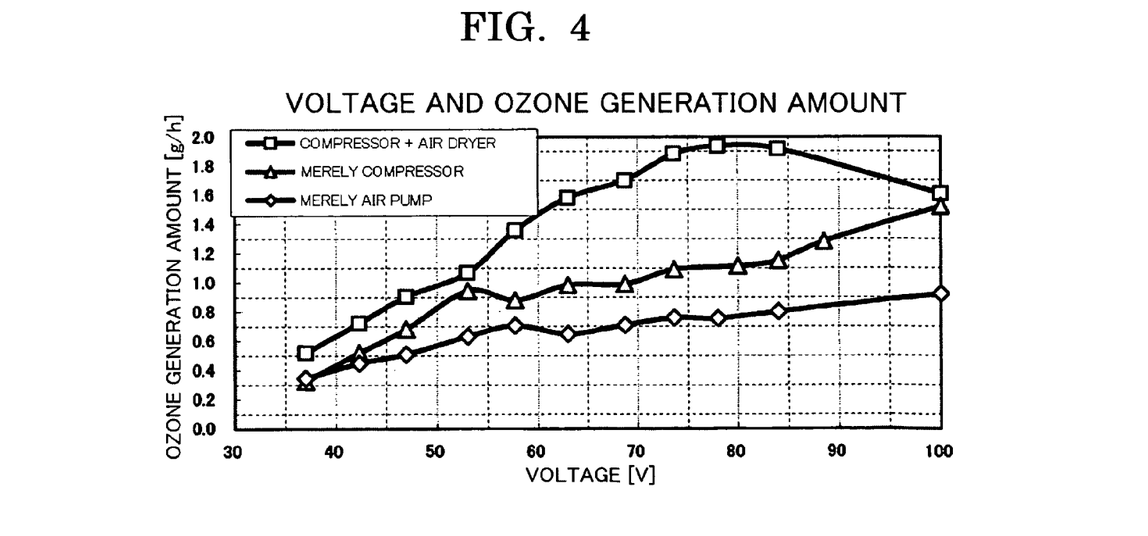
FIG. 4 is a graph showing the relation between the voltage in discharge and the generation amount of ozone.

In the graph of FIG. 4, the relation between the voltage and the ozone generation amount at an air flow rate of 5 L/min is shown. According to this graph, there is a difference of about 2.4 times between the ozone generation amount of the case using merely the air pump 13 and the generation amount of ozone of the case of FIG. 7 in which the compressor 15 and the air dryer 17 are combined. Even in the case of FIG. 6 in which the compressor 15 is used, the effect of 1.4 times can be recognized (at 80 V) when compared with the cause using the air pump.

These are the effects of the case in which the pressure of the used compressor 15 is 0.5 MPa as a condition of the graph of FIG. 4, and the generation amount can be increased when the pressure is increased.

Instead of the air dryer 17, the air may be dried by using an unshown drying agent such as silica gel or a freezing-type dryer, and, also in this case, equivalent effects as the case using the air dryer 17 can be obtained.

Furthermore, generation of ozone can be increased by using an unshown oxygen tank or oxygen generator (generally, PSA device).

Since the ultraviolet light is generated in the above described manner upon discharge, disinfection can also be performed when the ultraviolet light directly irradiates the water to be treated W. Moreover, since the inner tube 27 and the outer tube 28 are formed of a glass material as described above, the transmittance of the ultraviolet light is increased, and the irradiation amount of the ultraviolet light with respect to the water to be treated W is increased, thereby enhancing the disinfection power. Moreover, the photocatalyst can be also activated by the discharged light.

In addition, since the ultraviolet light source 34 is separately provided on the outside of the outer tube 28, the water to be treated W can be also disinfected/purified by the strong ultraviolet light from the ultraviolet light source 34, wherein the purification effects are further enhanced.

As described above, the fluid purification system 1 can generate high-concentration ozone by effectively changing oxygen into ozone and has the liquid purification function which mixes the ozone with the water to be treated W and performs purification. Furthermore, when disinfection of the water to be treated W or decomposition treatment of the organic matters and purification is performed by the photocatalyst 32 and the ultraviolet rays, a purification treat can be effectively performed.

For example, when air is a raw material, the ozone generation amount of up to 3 g/h can be obtained. Therefore, a bath of about 20 to 60 t can be handled as the bath equipped with the fluid purification system. Herein, contamination by Legionella about to be generated in the bath can be reliably prevented.

Furthermore, when oxygen is a raw material, an ozone generation amount of about 15 g/h is obtained, and a bath of up to about 300 t can be handled.

In the fluid purification method, various fluids other than the hot water of the bath 2 can be used as the object of the water to be treated W, and, for example, liquid such as domestic discharge water or industrial water can be treated. Moreover, other than liquid, oxygen, air, or another gas can be subjected to the purification treat as the fluid to be treated W.

In this case, a conductive member is attached to a part or the entire periphery of the inside of the outer tube so as to provide one electrode, a conductive member having a width equal to or more than that of the electrode of the outer tube is attached to the inside of the inner tube so as to provide the other electrode, a voltage is applied between the electrodes so as to cause discharge in the space of the inner tube and the outer tube and generate ozone, and the gas purification function can be exerted when the ozone is mixed with the gas flowing within the inner tube.

The invention claimed is:

1. A fluid purification device comprising:
a device main body including:
an inner tube composed of a non-conductive material;
an outer tube composed of a non-conductive material, said outer tube being spaced apart from said inner tube by a predetermined distance and being arranged concentrically with respect to said inner tube, each of said inner tube and said outer tube being transparent or semi-transparent to ultraviolet light; and
a conductive member attached to a part of an inner surface of said outer tube to form an electrode;
a photocatalyst material of titanium or titanium alloy located within said inner tube; and
an ultraviolet light source arranged to irradiate an outer peripheral surface of said outer tube with ultraviolet light;
wherein said device main body is configured so that, when a voltage is applied to said electrode, a discharge in a space between said inner tube and said outer tube is created using a liquid flowing within said inner tube as an earth electrode so as to cause a gas flowing through said space to react to generate ozone;
wherein said device main body is configured to allow the ozone to mix with the liquid so as to purify the fluid; and
wherein said photocatalyst material is activated by the ultraviolet light received from the discharge in said space and from said ultraviolet light source.

2. The fluid purification device according to claim 1, wherein said ultraviolet light source is an electrodeless discharge tube.

3. The fluid purification device according to claim 2, further comprising a compression device for compressing the gas flowing in said space between said outer tube and said inner tube to a pressure in a range of 0.2 MPa to 1 MPa, and a fluid controller for adjusting a flow of the gas flowing in said space to a flow in a range of 1 L/min to 20 L/min.

4. The fluid purification device according to claim 2, further comprising a compression device for compressing the gas flowing in said space between said outer tube and said inner tube to a pressure in a range of 0.2 MPa to 1 MPa, an air dryer for drying the compressed gas from said compression device, and a fluid controller for adjusting a flow of the gas flowing in said space to a flow in a range of 1 L/min to 20 L/min.

5. The fluid purification device according to claim 2, further comprising a tubular body attached to an upstream side of said device main body, and a hair catcher detachably incorporated into said tubular body.

6. The fluid purification device according to claim 1, further comprising a compression device for compressing the gas flowing in said space between said outer tube and said inner tube to a pressure in a range of 0.2 MPa to 1 MPa, and a fluid controller for adjusting a flow of the gas flowing in said space to a flow in a range of 1 L/min to 20 L/min.

7. The fluid purification device according to claim 1, further comprising a compression device for compressing the gas flowing in said space between said outer tube and said inner tube to a pressure in a range of 0.2 MPa to 1 MPa, an air dryer for drying the compressed gas from said compression device, and a fluid controller for adjusting a flow of the gas flowing in said space to a flow in a range of 1 L/min to 20 L/min.

8. The fluid purification device according to claim 1, further comprising a tubular body attached to an upstream side of said device main body, and a hair catcher detachably incorporated into said tubular body.

9. The fluid purification device according to claim 1, wherein said conductive member is belt-shaped with an approximately C-shaped cross section and a width in a range of 10 mm to 50 mm.

10. A fluid purification device comprising:
a device main body including:
an inner tube composed of a non-conductive material;
an outer tube composed of a non-conductive material, said outer tube being spaced apart from said inner tube by a predetermined distance and being arranged concentrically with respect to said inner tube, each of said inner tube and said outer tube being transparent or semi-transparent to ultraviolet light;
a first conductive member attached to a part of an inner surface of said outer tube to form a first electrode; and
a second conductive member attached to a part of an inner surface of said inner tube to form a second electrode, said second conductive member having a width equal to or larger than a width of said first conductive member;
a photocatalyst material of titanium or titanium alloy located within said inner tube; and
an ultraviolet light source arranged to irradiate an outer peripheral surface of said outer tube with ultraviolet light;
wherein said device main body is configured so that, when a voltage is applied between said first electrode and said second electrode, a discharge in a space between said inner tube and said outer tube is created so as to cause a gas flowing through said space to react to generate ozone;
wherein said device main body is configured to allow the ozone to mix with a gas flowing within said inner tube so as to purify the gas; and
wherein said photocatalyst material is activated by the ultraviolet light received from the discharge in said space and from said ultraviolet light source.

11. The fluid purification device according to claim 10, wherein said ultraviolet light source is an electrodeless discharge tube.

12. The fluid purification device according to claim 11, further comprising a compression device for compressing the gas flowing in said space between said outer tube and said inner tube to a pressure in a range of 0.2 MPa to 1 MPa, and a fluid controller for adjusting a flow of the gas flowing in said space to a flow in a range of 1 L/min to 20 L/min.

13. The fluid purification device according to claim 11, further comprising a compression device for compressing the gas flowing in said space between said outer tube and said inner tube to a pressure in a range of 0.2 MPa to 1 MPa, an air dryer for drying the compressed gas from said compression device, and a fluid controller for adjusting a flow of the gas flowing in said space to a flow in a range of 1 L/min to 20 L/min.

14. The fluid purification device according to claim 11, further comprising a tubular body attached to an upstream side of said device main body, and a hair catcher detachably incorporated into said tubular body.

15. The fluid purification device according to claim 10, further comprising a compression device for compressing the gas flowing in said space between said outer tube and said inner tube to a pressure in a range of 0.2 MPa to 1 MPa, and a fluid controller for adjusting a flow of the gas flowing in said space to a flow in a range of 1 L/min to 20 L/min.

16. The fluid purification device according to claim 10, further comprising a compression device for compressing the gas flowing in said space between said outer tube and said inner tube to a pressure in a range of 0.2 MPa to 1 MPa, an air dryer for drying the compressed gas from said compression device, and a fluid controller for adjusting a flow of the gas flowing in said space to a flow in a range of 1 L/min to 20 L/min.

17. The fluid purification device according to claim 10, further comprising a tubular body attached to an upstream side of said device main body, and a hair catcher detachably incorporated into said tubular body.

18. The fluid purification device according to claim 10, wherein said first conductive member is belt-shaped with an approximately C-shaped cross section and a width in a range of 10 mm to 50 mm.

19. A fluid purification method comprising:
providing an inner tube composed of a non-conductive material, and an outer tube composed of a non-conductive material, and spacing the outer tube apart from the inner tube by a predetermined distance so that the outer tube is arranged concentrically with respect to the inner tube, each of the inner tube and the outer tube being transparent or semi-transparent to ultraviolet light;
attaching a conductive member to a part of an inner surface of the outer tube to form an electrode;
arranging a photocatalyst material of titanium or titanium alloy within the inner tube;
irradiating an outer peripheral surface of said outer tube with ultraviolet light using an ultraviolet light source;
applying a voltage to the electrode to create a discharge in a space between the inner tube and the outer tube using a liquid flowing within the inner tube as an earth electrode so as to cause a gas flowing through the space to react to generate ozone;
mixing the ozone with the liquid flowing within the inner tube; and
activating the photocatalyst material using the ultraviolet light received from the discharge in the space and from the ultraviolet light source so as to purify the liquid.

20. A fluid purification method comprising:
providing an inner tube composed of a non-conductive material, and an outer tube composed of a non-conductive material, and spacing the outer tube apart from the inner tube by a predetermined distance so that the outer tube is arranged concentrically with respect to the inner tube, each of the inner tube and the outer tube being transparent or semi-transparent to ultraviolet light;
attaching a first conductive member to a part of an inner surface of the outer tube to form a first electrode;
attaching a second conductive member to a part of an inner surface of the inner tube to form a second electrode, the second conductive member having a width equal to or larger than a width of the first conductive member;
arranging a photocatalyst material of titanium or titanium alloy within the inner tube;
irradiating an outer peripheral surface of the outer tube with ultraviolet light using an ultraviolet light source;
applying a voltage between the first electrode and the second electrode to create a discharge in a space between the inner tube and the outer tube so as to cause a gas flowing through the space to react to generate ozone;
mixing the ozone with the gas flowing within the inner tube; and
activating the photocatalyst material using the ultraviolet light received from the discharge in the space and from the ultraviolet light source so as to purify the gas.

* * * * *